April 14, 1936.　　　　S. HERTZ ET AL　　　　2,037,627
DEVICE FOR CONTROLLING THE ACTION OF A FLUID UNDER PRESSURE
Filed Sept. 4, 1934　　　3 Sheets-Sheet 1
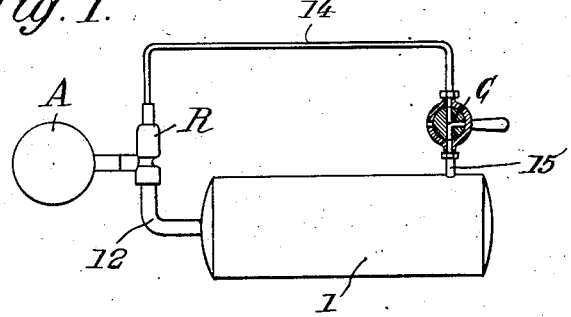
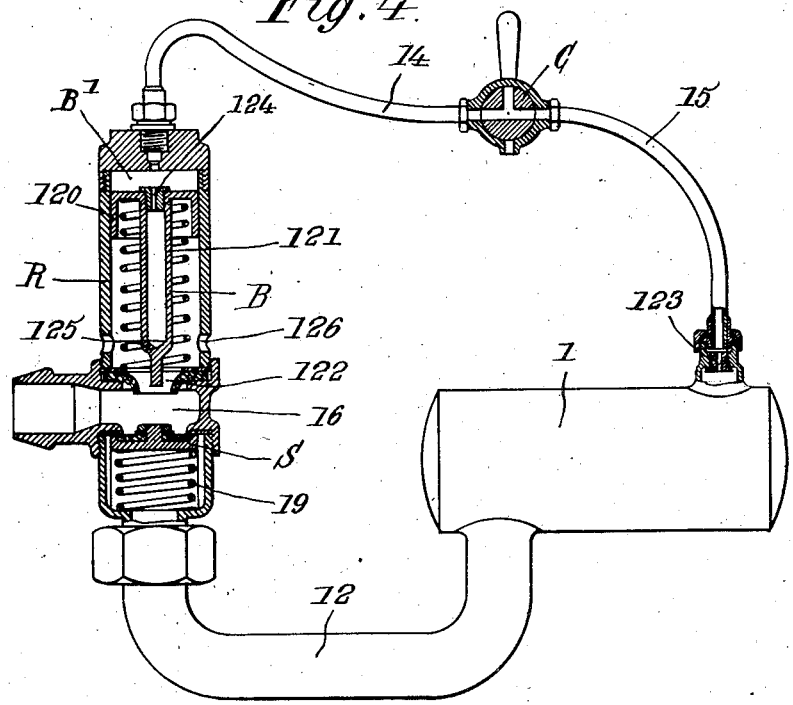
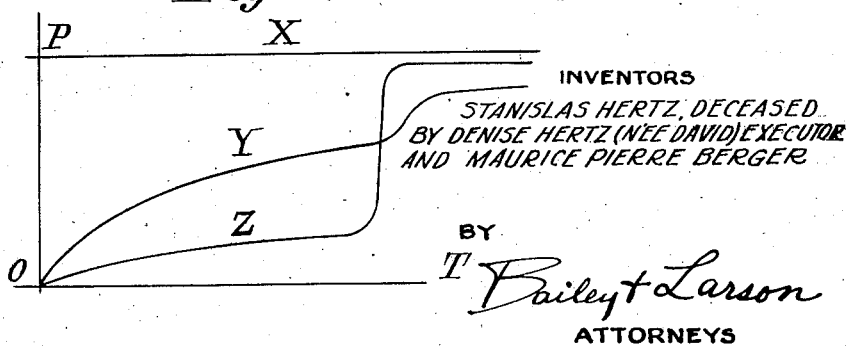
INVENTORS
STANISLAS HERTZ, DECEASED
BY DENISE HERTZ (NEE DAVID) EXECUTOR
AND MAURICE PIERRE BERGER
BY
Bailey + Larson
ATTORNEYS

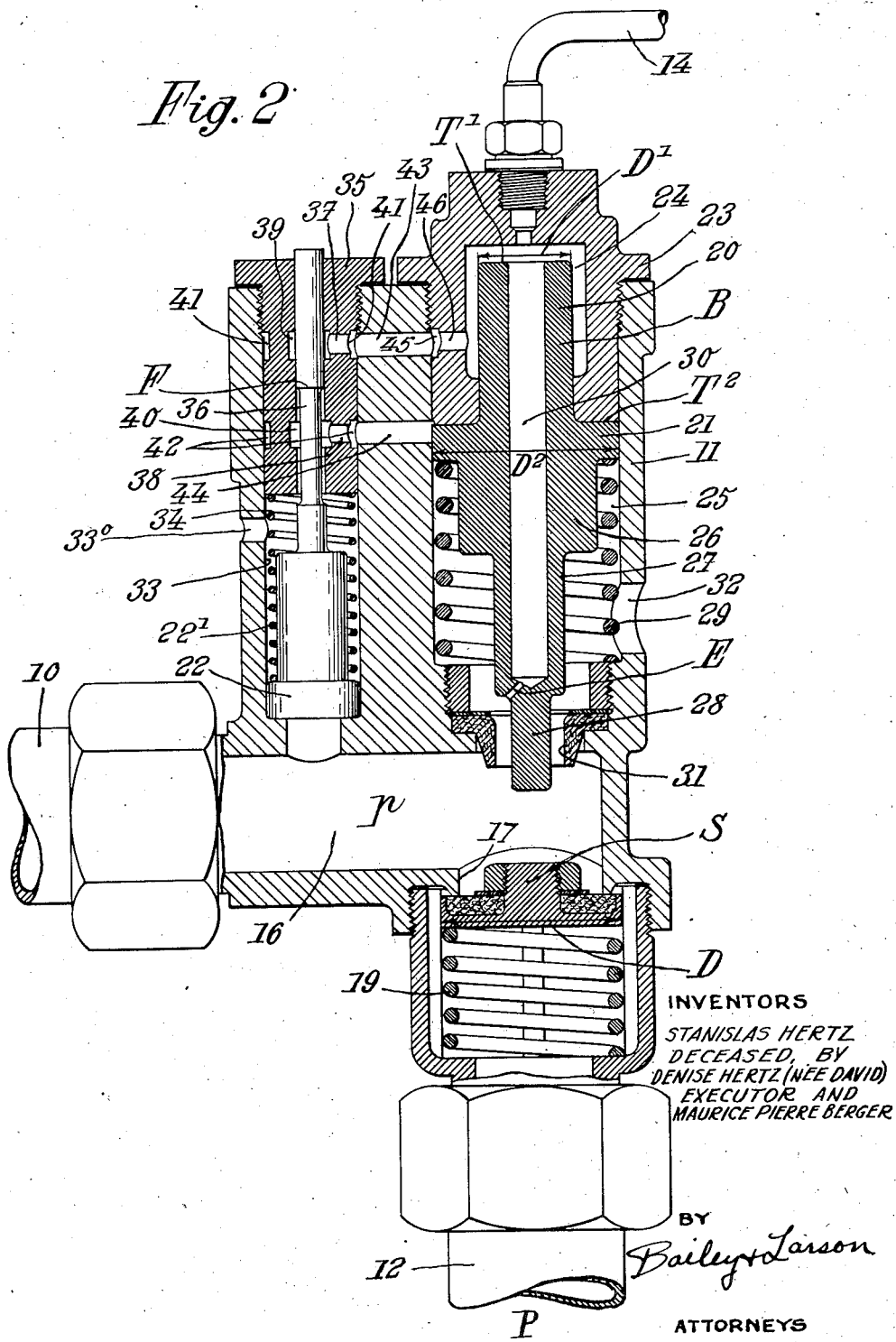

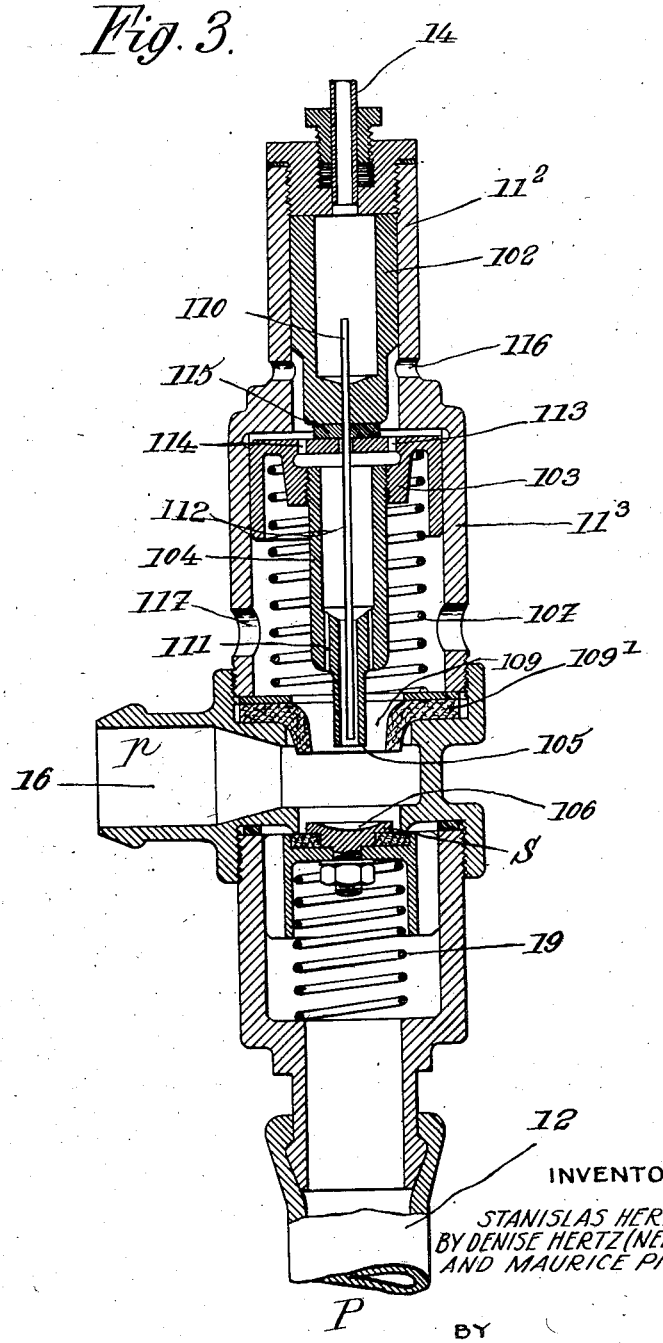

Patented Apr. 14, 1936

2,037,627

UNITED STATES PATENT OFFICE 2,037,627

DEVICE FOR CONTROLLING THE ACTION OF A FLUID UNDER PRESSURE

Stanislas Hertz, deceased, late of Paris, France, by Denise Hertz, née David, executor, Paris, France, and Maurice Pierre Berger, Paris, France Application September 4, 1934, Serial No. 742,672
In Belgium September 13, 1933

10 Claims. (Cl. 303—1)

The present invention relates to devices for controlling the action of a fluid under pressure and it is more particularly concerned with devices for controlling the action of a gaseous fluid, such for instance as compressed air.

The object of the present invention is to provide a device of the type above referred to which is better adapted to comply with the requirements of practice and especially which moderates and renders less sudden the action of the fluid under pressure on the apparatus to be operated by said fluid, so as to reduce the wear and tear of said apparatus.

The essential feature of the present invention consists in providing a relay which first causes the fluid to be fed to said apparatus with a gradually increasing pressure, a valve for feeding the fluid at full pressure to said apparatus, and a mechanism operated by the fluid under pressure in said relay for opening said valve when said pressure in the relay reaches a predetermined value.

According to a first embodiment of the present invention, this control mechanism consists of two pistons rigid with each other and only one of which is first subjected to the action of the fluid under pressure from the reservoir of fluid, the surface of this piston being too small for allowing the valve to be forced open; means operative by the fluid under pressure in the relay subsequently causing the fluid from said reservoir to act on the second piston, the active surface of which is such that the combined actions of the fluid under pressure on both pistons overcome the resistance of the valve and open it.

According to another embodiment of the invention, the control mechanism consists of two pistons movable with respect to each other but adapted to bear against each other, only one of these pistons being subjected to the action of the fluid under pressure from the reservoir, this piston being of such a surface that this action is not sufficient for overcoming the resistance of the valve, the space between the two pistons being connected with the inside of the relay so that the fluid under gradually increasing pressure fed to said space finally causes the second piston, the surface of which is much larger than that of the first one to force said valve open.

According to a third embodiment of the present invention, the control mechanism of the valve consists of a single piston, and throttling means are provided for causing the fluid from said reservoir to act on said piston with a progressively increasing pressure, whereby, after a certain time the action exerted on said piston is sufficient for overcoming the resistance of the valve and forcing it open; other throttling means are provided for the flow of the fluid through said relay to the apparatus to be actuated by said fluid, before the opening of the valve.

These and other features of the present invention will appear from the following detailed description of specific embodiments of said invention.

Preferred embodiments of the present invention will be hereinafter described, with reference to the accompanying drawings, given merely by way of example and in which:

Fig. 1 is a diagrammatic general view of a system embodying the fluid controlling device according to the present invention;

Fig. 2 is a sectional view of an embodiment of the device according to the present invention;

Fig. 3 is a sectional view of another embodiment of the invention;

Fig. 4 is a diagrammatic general view of a system as illustrated by Fig. 1, showing in section a third embodiment of the control device according to the present invention;

Fig. 5 is a diagram showing the pressure curves.

According to Fig. 1, an apparatus A is to be actuated by means of a compressed fluid (compressed air for instance) present in a reservoir I. This apparatus A may be of any type whatever (braking apparatus, starting device for internal combustion engines, etc.), but it will be readily understood that the parts of this apparatus, for instance a piston and a cylinder movable with respect to each other, should not be suddenly subjected to the full pressure of the fluid in reservoir I, as a sudden action of the fluid would rapidly deteriorate and even break these parts.

In order to obviate this drawback, there is provided, according to the present invention, a relay R including:

(a) means for feeding, in a first step of the operation, fluid at a gradually increasing pressure, lower than the pressure in reservoir I, to apparatus A, this fluid being fed from reservoir I through pipes 15 and 14, controlled for instance through a valve C operated in any suitable manner, and (b) a valve for admitting, in the second step of the operation, fluid at full pressure, through conduit 12, into conduit 10 and apparatus A, this valve being actuated by the control mechanism of the relay, which is adapted to automatically open the valve at the end of the first step of the operation.

In order to obtain this result, the relay includes a passage of restricted section of flow for throttling the stream of fluid fed to the relay during the first step of the operation. This throttling passage E may be either independent of valve S and control plunger B, or combined therewith, as shown in Figs. 2, 3 and 4. According to the present invention, the control plunger B is first subjected by the liquid or gas under pressure to an action which brings it into contact with the valve, without opening said valve, and then to another action by the fluid under pressure which causes said valve to open when the pressure in the relay reaches a predetermined value $h$ which is independent of the actual pressure of the fluid in reservoir 1.

According to a first embodiment of the invention, shown in Fig. 2, plunger B advantageously comprises two active surfaces $T^1$ and $T^2$ intended to be subjected to the action of the fluid under pressure from the reservoir, the first one as soon as the relay is brought into action, and the second one at the end of the first step of the operation, the active area of these surfaces being such that the forces they transmit to valve S are respectively lower and higher (and of opposite directions) than the force that tends to keep the valve applied against its seat under the effect of the pressure H of the reservoir.

The device further includes a distributing system F, adapted to be actuated by the pressure $h$ in conduit 10 and to bring into operative contact with surface $T^2$ the air under pressure H of the reservoir.

This piston will for instance consist of two piston elements 20 and 21 located one above the other.

Piston element 21, which is of a diameter $D^1$ smaller than the diameter D of the seat 17 of valve S is mounted in a cylinder 23 provided with a chamber 24 surrounding piston element 21. Said piston element is subjected to the action of the fluid under pressure fed through pipe 14 into this chamber 24.

The other piston element 21, which is of a diameter $D^2$ larger than the diameter D of the valve seat, is slidable in a cylinder 25 provided in the casing 11 of the relay. This piston 21 is rigid with a prolonged, preferably stepped, part 26, 27, 28 the end 28 of which is adapted to come into contact with valve S.

The whole of the two piston elements is subjected to the action of a spring 29.

Valve S is mounted, in coaxial relation with these piston elements in the case into which opens a pipe 12 directly connected with reservoir 1. This valve is subjected to the action of a relatively weak spring 19 urging it toward its seat.

If the passage of throttled section E is provided in the vicinity of the extremity 28 of the piston, said passage communicating with chamber 24 through conduit 30 provided in the piston, the whole can be arranged in such manner that, when piston 20—21 is in the position of rest, a chamber 16 provided on the inside of the casing 11 of the relay is in communication with chamber 25 through passage 31, said chamber 25 being itself connected with the atmosphere through a port 32, while when this piston 20—21 is in its operative position, portion 27 of this piston unit closes this passage 31, which consists for instance of a leather element. chamber 16 now being in communication with chamber 24 and conduit 14 through throttled passage E.

As for the distributing system above referred to and designated by reference letter F, it may be of any suitable type and consists, for instance of a slide valve arrangement controlled by a piston 22 movable in a cylinder 33 and subjected on the one hand to the action of a spring $22^1$ of suitable strength, eventually adjustable, and, on the other hand, to the action, directly opposite, of the liquid under pressure $h$ present in the chamber 16 of the relay.

The slide valve arrangement comprises, for instance, a rod 34 rigid with piston 22 (or suitably connected thereto) slidable inside a plug 35 screwed in bore 33 and provided with a part 36 of reduced cross sectional area adapted to establish a connection between two ports 37 and 38. When piston 22 is pushed up by the fluid under pressure in chamber 16 against the action of its spring $22^1$, (the upper part of cylinder 33 being connected with the atmosphere through port 33°), the rod 36 connects two chambers 39 and 40 through these ports 37 and 38.

Therefore, if these ports are themselves connected to chamber 24 and the end of cylinder 25 respectively, the compressed fluid fed into this chamber 24 is allowed to flow against the surface $T^2$ of piston 21.

These ports 37 and 38 open for instance, in the lateral surface of plug 35, into annular grooves 41 and 42 respectively. Groove 41 is connected, through another annular groove 45 and port 43, with a duct 46 opening into chamber 24. Groove 42 is connected with the end of cylinder 25 in which is located surface $T^2$.

The operation of the device above described is the following:

In order to operate apparatus A, it suffices to act on valve C so as to connect chamber 24 with reservoir 1 through conduit 14. Pistons 20—21 are then moved downwardly, compressing spring 29 and the end 28 of piston 21 comes into contact with valve S. But as the fluid under pressure acts only on surface $T^1$, the force transmitted by the pistons is not sufficient for opening valve S.

At the same time the communication between chamber 16 and chamber 25 is cut off, and the pressure due to the inflow of air through throttled passage E begins to rise in chamber 16 and conduit 10, owing to the resistance opposed to the displacement of the parts of apparatus A. When this pressure reaches a predetermined value, it pushes piston 22 against the action of its spring $22^1$, so that surface $T^2$ is now connected with chamber 24 through conduit 43, distributing device F and conduit 44.

It follows that, since the pressure of the fluid from reservoir 1 now acts on both of the surfaces $T^1$ and $T^2$, the resulting force transmitted by piston 20—21 is sufficient for opening valve S. The full pressure of the fluid in reservoir 1 is now transmitted to chamber 16 and conduit 10.

When it is no longer desired to operate apparatus A, it suffices to operate valve C in the opposite direction so as to bring conduit 14 into connection with the atmosphere.

In relay R, pistons 20—21 are then brought back into their initial position; valve S is brought back onto its seat and the compressed air present in apparatus A escapes to the atmosphere through conduit 10, chamber 16 and port 32. The auxiliary piston 22 then comes back to its initial position and the whole mechanism is again ready for a new operation.

The device which has just been described, while exerting a relatively sudden and strong action on apparatus A, avoids any destruction of this apparatus because the application of this action is preceded by a progressive increase of the pressure up to a predetermined value.

If, for instance, apparatus A includes a clutch device provided with jaws adapted to come into mesh during the first step of the operation, the engagement of these jaws with one another can take place very smoothly.

It is very important to note that the value of pressure $h$ for which the distributing device F is brought into play remains the same irrespective of the value of the fluid pressure in reservoir 1 and even when this fluid pressure has dropped due, for instance, to repeated operations of the device.

Finally, the pressure in conduit 10 and in chamber 16 rises only if the parts of apparatus A offer a suitable resistance.

Supposing, for instance, apparatus A to be a starter for internal combustion engines of the Diesel type, if the engineer inadvertently operates the starter when the engine is already started, the pressure in chamber 16 cannot rise because there is no mechanical resistance to the working of starter A, and therefore the second step of the operation does not take place. This feature prevents a possible breakage of the apparatus and a waste of compressed air.

In the embodiment of Fig. 3, pistons 102 and 103 are disposed in line with each other and are preferably separated from each other by a leather disc 115, or the equivalent. The piston of larger diameter 103 is located next to chamber 16. Advantageously, the diameter of the other piston 102 is substantially equal to the diameter of the active surface of valve S.

The compressed air fed by conduit 14 into cylinder 11² which cooperates with the piston 102 of smaller diameter, can penetrate into chamber 16 through a conduit 110 extending through said piston and fixed therein in a fluidtight manner, for instance by soldering. Conduit 110 also extends throughout piston 103 but without being fixed thereto.

The end of this piston 103 forms, opposite valve S, a hollow rod 104 of a diameter substantially equal to that of the aperture 109 of a packing member 109¹, for instance of leather, interposed between cylinder 11³, which cooperates with piston 103, and chamber 16.

This rod 104 is prolonged by a part of smaller diameter 105, also hollow for affording a passage for conduit 110.

Furthermore conduits 111 are provided in rod 104 in such manner that, after this rod has penetrated into passage 109, chamber 16 can communicate with the inner chamber 112 provided in rod 104. This chamber 112 itself communicates through ports 113 and 114 with the active surface of piston 103, that is to say with the space between pistons 102 and 103.

Piston 103 is subjected to the action of a return spring 107, and valve S is subjected to the action of a return spring 19. Finally escape ports 116 and 117 are provided in cylinders 11² and 11³.

This device works in the following manner:

As in the preceding embodiment, the relay is brought into action by operating valve C interposed between pipe elements 14 and 15 which connect cylinder 11² with reservoir 1. The compressed air, coming into contact with the smaller piston 102, causes it to move downwardly, pushing piston 103 also downwardly.

The end 105 of the rod 104 then comes into contact with valve S, but the force applied to the whole of the two pistons is not sufficient for causing valve S to open.

The upper face of this valve is provided with a small concave slot 106 so that, after the end 105 of piston 103 has come into contact with the valve, the air coming through conduit 110 can escape into chamber 16 by flowing through this slot.

In the course of this downward movement, the rod 104 of piston 103 closes passage 109. The air coming into chamber 16 causes the pressure therein to rise. Furthermore, this air under pressure flows, through passages 111, 112, 113 and 114, into the space between pistons 102 and 103.

The active face of piston 103 is then subjected to the action of an increasing pressure until, for a certain value $p$ of this pressure, the total effort applied on both pistons is sufficient for opening valve S, against the action of springs 107 and 19. Air at full pressure from conduit 12 is then admitted into chamber 16.

It is possible to ascertain the forces that are acting at this time. In the following table, I have shown on the left hand side the forces acting to open the valve S, and on the right hand side the resistances acting in the opposite direction:

| Forces | Resistances |
|---|---|
| 1. Force $a$ resulting from the action of the pressure P of the reservoir on piston 102. | 1. Force $d$ resulting from the action of the pressure P of the reservoir on valve S. |
| 2. Force $b$ resulting from the action of pressure $p$ on the active surface of piston 103. | 2. Force $e$ resulting from the action of pressure $p$ on the under face of rod 104. |
| 3. Force $c$ resulting from the action of pressure $p$ on the upper face of valve S. | 3. Force $f$ resulting from the action of pressure $p$ on the under face of piston 102. |
| | 4. Resistance $g$ of spring 107. |
| | 5. Resistance $h$ of spring 19. |
| | 6. Internal resistances $i$. |

At the time above referred to, (it being presumed that the diameters of piston 102 and of the active surface of valve S, that is the inner diameter of the valve seat, are equal, so that forces $a$ and $d$ balance each other) the following condition must be complied with:

$$b+c=e+f+g+h+i$$

All these values are constants or depend only on pressure $p$. It is therefore possible to calculate the diameter of piston 103 and the strengths of springs 107 and 19 in such manner as to obtain the opening of valve S for a predetermined value of pressure $p$.

The equality of the areas of piston 102 and valve S makes it possible to wholly eliminate the action of the pressure P of reservoir 1, which is important because this pressure P is more or less variable.

The working of the relay for opening the valve has been above explained. It can easily be seen that the closing of the valve S is obtained by bringing valve C into the position that connects conduit 14 with the atmosphere. In this case, piston 102 is itself connected with the atmosphere through conduit 14 and valve C. This piston therefore comes back into its initial position under the action of the pressure P that exists at this time in chamber 16. Central conduit 110 and disc 115 are caused to move together with piston 102. But piston 103 remains in its lower position, owing to the high pressure P acting on its upper face.

When coming back to its initial position, piston 102 uncovers orifices 116, so that the air present between the two pistons escapes through these orifices. The larger piston 103 then moves upwardly, together with rod 104 which reopens passage 109 through which the air of chamber 16 can pass to the escape orifices 117. Valve S is then brought back into contact with its seat and the whole device is back in its initial state, ready for another operation.

It is generally of advantage to reduce the diameter of the larger piston 103, in order to reduce the space occupied by the relay. For this purpose, it is possible to provide around the part of piston 102 that is in contact with disc 115 (which part is of reduced diameter) a packing member analogous to leather element 109¹. Under these conditions, the counter-pressure $p$ would act only on this part of reduced diameter and the area of the larger piston might be reduced by an amount equal to the difference between the whole area of piston 102 and the part of reduced diameter of this piston.

According to another embodiment of the invention, shown by Fig. 4, relay R includes only one piston 120 having a hollow rod 121. The lower end of rod 121 closes passage 122 as soon as piston 120 is urged in a downward direction, that is to say toward the valve. Reservoir I communicates with space B¹ above the piston through a conduit 14, 15 provided with a three way cock C. Furthermore, a throttling device 123 is provided before this cock and a second throttling device 124 is provided at the entrance into space B¹. Preferably, rod 121 is also provided, at its lower part, with a third throttling device 125.

The working of this device is illustrated by the curves of Fig. 5. When cock C is opened, a gradually increasing pressure is exerted on piston 120, bringing rod 121 into contact with valve S. Air then flows into chamber 16 through orifices 124 and 125 and the pressure slowly rises. As soon as it reaches a predetermined value $p$, the force applied to piston 120 becomes sufficient for opening valve S.

In order to stop the operation it suffices to turn cock C in such manner as to connect chamber B¹ with the atmosphere.

Fig. 5 shows the variation of pressure P respectively in reservoir I, in chamber B¹ and in chamber 16, as a function of time T. The pressure in reservoir I is represented by a line X which is nearly horizontal, while the curves Y and Z represent the pressures in chambers B¹ and 16. The nearly vertical portion of curve Z corresponds to the opening of valve S.

It will be easy for someone skilled in the art to calculate the sections of passages 123, 124, 125 with a view to obtaining curves of the desired shape.

While I have, in the preceding description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What is claimed:

1. In a system including a reservoir of fluid under pressure, an apparatus to be actuated by said fluid under pressure, and a conduit for connecting said apparatus with said reservoir, a device for controlling the feed of fluid under pressure from said reservoir to said apparatus, which comprises, in combination, a valve in said conduit for controlling the flow of fluid therethrough, said valve being normally closed, a passage normally connecting the portion of said conduit between said apparatus and said valve with the atmosphere, means operative by the fluid under pressure from said reservoir for stopping said passage, means including a passage of restricted cross section for feeding fluid under pressure from said reservoir to said portion of the conduit, whereby the pressure in said portion of the conduit gradually rises up to a predetermined value, and means operative by the fluid under pressure for opening said valve.

2. In a system including a reservoir of fluid under pressure, an apparatus for use by said fluid under pressure, and a conduit for connecting said apparatus with said reservoir, a device for controlling the feed of fluid under pressure from said reservoir to said apparatus, which comprises, in combination, a valve in said conduit for controlling the flow of fluid therethrough, said valve being normally closed, a passage normally connecting the portion of said conduit between said apparatus and said valve with the atmosphere, a movable member operative by the fluid under pressure from said reservoir, means operative by said member for stopping said passage when said member is subjected to the pressure from said reservoir, said member being provided with a duct of restricted cross section for feeding fluid under pressure from said reservoir to said portion of the conduit, whereby the pressure in said portion of the conduit gradually increases up to a predetermined value, and means operative by the fluid present in said portion of the conduit at this predetermined value of the pressure for opening said valve.

3. In a system including a reservoir of fluid under pressure, an apparatus to be actuated by said fluid under pressure and a conduit for connecting said apparatus with said reservoir, a device for controlling the feed of fluid under pressure from said reservoir to said apparatus, which comprises, in combination, a hollow casing directly connected at one end with the portion of said conduit that leads to this apparatus, a valve interposed between the other end of said casing and the portion of said conduit that leads to this reservoir adapted to control the flow of fluid to said casing, elastic means for urging said valve toward its closed position, a passage in said casing for normally connecting the inside thereof with the atmosphere, two cylinders of different diameters in line with each other, two piston elements rigid with each other slidably fitting in said cylinders respectively and adapted to act on said valve for opening it, means for feeding fluid under pressure from said reservoir to the cylinder of smaller diameter so as to cause it to act on the smaller piston, means carried by said pistons for stopping said passage when said smaller piston is subjected to the pressure from said reservoir, said pistons being provided with a duct of restricted section connecting the cylinder of smaller diameter with the inside of the casing, whereby the pressure in said casing gradually rises up to a predetermined value when fluid under pressure is fed to said cylinder of smaller diameter, a normally closed passage for connecting these two cylinders with each other, and means operative by the fluid present in said casing when the pressure thereof has reached this predetermined value for opening this last mentioned passage.

4. A device according to claim 3 further comprising a spring opposing the movements of said pistons in the direction that tends to open said valve.

5. In a system including a reservoir of fluid under pressure, an apparatus to be actuated by said fluid under pressure, and a conduit for connecting said apparatus with said reservoir, a device for controlling the feed of fluid under pressure from said reservoir to said apparatus, which comprises, in combination, a hollow casing directly connected at one end with the portion of said conduit that leads to this apparatus, a valve interposed between the other end of said casing and the portion of said conduit that leads to this reservoir adapted to control the flow of fluid to said casing, elastic means for urging said valve towards its closed position, a passage in said casing for normally connecting the inside thereof with the atmosphere, two cylinders of different diameters in line with each other, two pistons adapted to bear against each other slidably fitting in said cylinders respectively, means carried by the larger piston adapted to act on the smaller piston for opening it, means for feeding fluid under pressure from said reservoir to the cylinder of smaller diameter so as to cause it to act on the smaller piston, which in turn pushes the larger piston, means carried by the larger piston for stopping said passage when said smaller piston is subjected to the pressure from said reservoir, said smaller piston being provided with a duct of restricted section of flow extending throughout the larger piston for connecting the cylinder of smaller diameter with the inside of the casing, whereby the pressure in said casing gradually rises up to a predetermined value when fluid under pressure is fed to said cylinder of smaller diameter, and a passage in said larger piston for connecting the inside of the casing with the larger cylinder whereby the pressure of the fluid present in said casing causes said larger piston to open said valve.

6. A device according to claim 5 further comprising elastic means opposing the displacement of said larger piston in the direction that corresponds to the opening of said valve.

7. In a system including a reservoir of fluid under pressure, an apparatus to be operated by said fluid under pressure, and a conduit for connecting said apparatus with said reservoir, a device for controlling the feed of fluid under pressure from said reservoir to said apparatus, which comprises, in combination, a hollow casing directly connected at one end with the portion of this conduit that leads to this apparatus, a valve interposed between the other end of said casing and the portion of said conduit that leads to this reservoir adapted to control the flow of fluid to said casing, elastic means for urging said valve toward its closed position, a passage in said casing for normally connecting the inside thereof with the atmosphere, a cylinder connected with said casing, a piston slidably fitting in said cylinder adapted to act on said valve for opening it, means including at least one passage of restricted section of flow for feeding fluid under pressure from said reservoir into said cylinder, means carried by said piston for stopping said passage when said piston is subjected to the pressure of this fluid, said piston being provided with a duct of restricted section of flow for connecting said cylinder with the inside of the casing, whereby the pressure in said casing gradually rises when fluid under pressure is fed to said cylinder, and a spring opposing the movements of said piston in the direction that corresponds to the opening of said valve.

8. A device according to claim 5 in which the diameter of said smaller piston and the diameter of the active surface of said valve are substantially equal.

9. In a system including a reservoir of fluid under pressure, an apparatus to be operated by said fluid under pressure, and a conduit for connecting said apparatus with said reservoir, a device for controlling the feed of fluid under pressure from said reservoir to said apparatus, which comprises, in combination, a hollow casing directly connected at one end with the portion of said conduit that leads to the apparatus, a valve interposed between the other end of said casing and the portion of said conduit that leads to the reservoir adapted to control the flow of fluid to said casing, a passage in said casing for normally connecting the inside thereof with the atmosphere, a cylinder connected with said casing, a piston slidably fitting in said cylinder adapted to act on said valve for opening it, means including another valve adapted to be actuated by hand for feeding fluid under pressure from said reservoir into said cylinder, means carried by said piston for stopping said passage when said piston is subjected to the pressure of this fluid, said piston being provided with a duct of restricted section of flow for connecting said cylinder with the inside of the casing, whereby the pressure in said casing gradually rises when fluid under pressure is fed to said cylinder, and a spring opposing the movements of said piston in the valve-opening direction of said piston.

10. In a system including a reservoir of fluid under pressure, an apparatus to be operated by said fluid under pressure, and a conduit for connecting said apparatus with said reservoir, a device for controlling the feed of fluid under pressure from said reservoir to said apparatus, which comprises, in combination, a hollow casing directly connected at one end with the portion of the conduit that leads to the apparatus, a valve interposed between the other end of said casing and the portion of said conduit that leads to the reservoir adapted to control the flow of fluid to said casing, a cylinder connected with said casing, a piston slidably fitting in said cylinder adapted to act on said valve for opening it, means including another valve to be actuated by hand for feeding fluid under pressure from said reservoir into said cylinder, a duct in said piston of restricted section of flow for connecting said cylinder with the inside of the casing, whereby the pressure in said casing gradually rises when fluid under pressure is fed to said cylinder, and a spring opposing the movements of said piston in the valve-opening direction of said piston.

DENISE HERTZ, NÉE DAVID.
*Executor of Stanislas Hertz, Deceased.*
MAURICE PIERRE BERGER.